US011528086B2

(12) United States Patent
Venugopal et al.

(10) Patent No.: US 11,528,086 B2
(45) Date of Patent: Dec. 13, 2022

(54) LINK CONFIGURATION SPECIFIC MODULATION AND CODING SCHEME (MCS)

(71) Applicant: QUALCOMM Incorporated, San Diego, CA (US)

(72) Inventors: Kiran Venugopal, Raritan, NJ (US); Tao Luo, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/905,493

(22) Filed: Jun. 18, 2020

(65) Prior Publication Data

US 2020/0403722 A1 Dec. 24, 2020

Related U.S. Application Data

(60) Provisional application No. 62/864,316, filed on Jun. 20, 2019.

(51) Int. Cl.
*H04L 1/20* (2006.01)
*H04L 1/00* (2006.01)

(52) U.S. Cl.
CPC .......... *H04L 1/0003* (2013.01); *H04L 1/0009* (2013.01); *H04L 1/0016* (2013.01); *H04L 1/0026* (2013.01)

(58) Field of Classification Search
CPC ... H04L 1/0003; H04L 1/0009; H04L 1/0016; H04L 1/0026
USPC .......................................... 375/377; 370/329
See application file for complete search history.

(56) References Cited

U.S. PATENT DOCUMENTS

| 10,305,627 | B2 * | 5/2019 | Li | H04L 1/0003 |
| 2014/0192732 | A1 * | 7/2014 | Chen | H04L 1/0025 370/329 |
| 2015/0312071 | A1 * | 10/2015 | Chen | H04L 1/0031 370/329 |
| 2016/0330738 | A1 * | 11/2016 | Eitan | H04L 27/2602 |

(Continued)

FOREIGN PATENT DOCUMENTS

| WO | 2015164251 A1 | 10/2015 | |
| WO | WO-2018203989 A1 * | 11/2018 | H04L 27/08 |

OTHER PUBLICATIONS

5G/Share Technote, "5G/NR—MCS/TBS/Code Rate" https://www.sharetechnote.com/html/5G/5G_MCS_TBS_CodeRate.html, retrieved date Jul. 23, 2021, pp. 1-13.*

(Continued)

*Primary Examiner* — Syed Haider
(74) *Attorney, Agent, or Firm* — Patterson + Sheridan, LLP

(57) ABSTRACT

Certain aspects of the present disclosure provide techniques for link configuration-specific modulation and coding scheme (MCS). A method that may be performed by a user equipment (UE) includes receiving control information indicating an MCS index corresponding to one or more MCS parameters to be used for a communication link, determining the one or more MCS parameters corresponding to the MCS index, wherein a mapping of the MCS index to the one or more MCS parameters is dependent on a configuration of the communication link, and communicating via the communication link in accordance with the one or more MCS parameters.

26 Claims, 8 Drawing Sheets

(56) References Cited

U.S. PATENT DOCUMENTS

| | | | |
|---|---|---|---|
| 2017/0034845 A1* | 2/2017 | Liu | H04W 72/1268 |
| 2017/0135098 A1 | 5/2017 | Kang et al. | |
| 2017/0171014 A1* | 6/2017 | Chen | H04L 1/003 |
| 2017/0207878 A1* | 7/2017 | Chen | H04W 24/02 |
| 2018/0115388 A1* | 4/2018 | Ljung | H04L 27/34 |
| 2019/0190644 A1* | 6/2019 | Ugurlu | H04W 72/042 |
| 2019/0215095 A1* | 7/2019 | Park | H04W 72/042 |
| 2019/0238257 A1* | 8/2019 | Hosseini | H04L 1/0004 |
| 2019/0253121 A1* | 8/2019 | Islam | H04B 7/0632 |
| 2019/0260495 A1* | 8/2019 | Nammi | H04L 1/0009 |

OTHER PUBLICATIONS

International Search Report and Written Opinion—PCT/US2020/038666—ISA/EPO—dated Sep. 30, 2020.

* cited by examiner

402 →

Configuration #1

| MCS Index $I_{MCS}$ | Modulation Order $Q_m$ | Target Code Rate | Spectral Efficiency |
|---|---|---|---|
| 0 | $MO_0$ | $TCR_0$ | $SE_0$ |
| 1 | $MO_1$ | $TCR_1$ | $SE_1$ |
| 2 | $MO_2$ | $TCR_2$ | $SE_2$ |
| 3 | $MO_3$ | $TCR_3$ | $SE_3$ |
| 4 | $MO_4$ | $TCR_4$ | $SE_4$ |
| 5 | $MO_5$ | $TCR_5$ | $SE_5$ |
| 6 | $MO_6$ | $TCR_6$ | $SE_6$ |
| 7 | $MO_7$ | $TCR_7$ | $SE_7$ |
| 8 | $MO_8$ | $TCR_8$ | $SE_8$ |
| 9 | $MO_9$ | $TCR_9$ | $SE_9$ |

Configuration #2

| MCS Index $I_{MCS}$ | Modulation Order $Q_m$ | Target Code Rate | Spectral Efficiency |
|---|---|---|---|
| 0 | $MO'_0$ | $TCR'_0$ | $SE'_0$ |
| 1 | $MO'_1$ | $TCR'_1$ | $SE'_1$ |
| 2 | $MO'_2$ | $TCR'_2$ | $SE'_2$ |
| 3 | $MO'_3$ | $TCR'_3$ | $SE'_3$ |
| 4 | $MO'_4$ | $TCR'_4$ | $SE'_4$ |
| 5 | $MO'_5$ | $TCR'_5$ | $SE'_5$ |
| 6 | $MO'_6$ | $TCR'_6$ | $SE'_6$ |
| 7 | $MO'_7$ | $TCR'_7$ | $SE'_7$ |

| Configuration #1 MCS Index $I_{MCS}$ | Configuration #2 MCS Index $I_{MCS}$ | Modulation Order $Q_m$ | Target Code Rate | Spectral Efficiency |
|---|---|---|---|---|
| 0 | 0 | $MO_1$ | $TCR_1$ | $SE_1$ |
|  | 1 | $MO_2$ | $TCR_2$ | $SE_2$ |
| 1 | 2 | $MO_3$ | $TCR_3$ | $SE_3$ |
| 2 | 3 | $MO_4$ | $TCR_4$ | $SE_4$ |
|  | 4 | $MO_5$ | $TCR_5$ | $SE_5$ |
| 3 | 5 | $MO_6$ | $TCR_6$ | $SE_6$ |
|  | 6 | $MO_7$ | $TCR_7$ | $SE_7$ |
| 4 | 7 | $MO_8$ | $TCR_8$ | $SE_8$ |
|  | 8 | $MO_9$ | $TCR_9$ | $SE_9$ |
| 5 | 9 | $MO_{10}$ | $TCR_{10}$ | $SE_{10}$ |

| Configuration #1 MCS Index $I_{MCS}$ | Configuration #2 MCS Index $I_{MCS}$ | Modulation Order $Q_m$ | Target Code Rate | Spectral Efficiency |
|---|---|---|---|---|
| 0 | 0 | $MO_1$ | $TCR_1$ | $SE_1$ |
| 1 | 1 | $MO_2$ | $TCR_2$ | $SE_2$ |
| 2 | 4 | $MO_3$ | $TCR_3$ | $SE_3$ |
| 3 | 3 | $MO_4$ | $TCR_4$ | $SE_4$ |
| 4 | 2 | $MO_5$ | $TCR_5$ | $SE_5$ |
| 5 | 5 | $MO_6$ | $TCR_6$ | $SE_6$ |
| 6 | 6 | $MO_7$ | $TCR_7$ | $SE_7$ |
| 7 | 7 | $MO_8$ | $TCR_8$ | $SE_8$ |
| 8 | 8 | $MO_9$ | $TCR_9$ | $SE_9$ |
| 9 | 9 | $MO_{10}$ | $TCR_{10}$ | $SE_{10}$ |

FIG. 5B

LINK CONFIGURATION SPECIFIC MODULATION AND CODING SCHEME (MCS)

CROSS-REFERENCE TO RELATED APPLICATION(S)

This application claims benefit of and priority to U.S. Provisional Application No. 62/864,316, filed Jun. 20, 2019, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for configuring a modulation and coding scheme (MCS).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly.

Certain aspects provide a method for wireless communication. The method generally includes receiving control information indicating a modulation and coding scheme (MCS) index corresponding to one or more MCS parameters to be used for a communication link, determining the one or more MCS parameters corresponding to the MCS index, wherein a mapping of the MCS index to the one or more MCS parameters is dependent on a configuration of the communication link, and communicating via the communication link in accordance with the one or more MCS parameters.

Certain aspects provide a method for wireless communication. The method generally includes determining one or more MCS parameters to be used for a communication link, selecting an MCS index corresponding to the or more MCS parameters, wherein a mapping of the MCS index to the one or more MCS parameters is dependent on a configuration of the communication link, generating control information comprising the MCS index, and transmitting the control information to a user-equipment (UE).

Certain aspects provide an apparatus for wireless communication. The apparatus generally includes a memory, and one or more processors coupled to the memory, the one or more processors and the memory being configured to receive control information indicating a MCS index corresponding to one or more MCS parameters to be used for a communication link, determine the one or more MCS parameters corresponding to the MCS index, wherein a mapping of the MCS index to the one or more MCS parameters is dependent on a configuration of the communication link, and communicate via the communication link in accordance with the one or more MCS parameters.

Certain aspects provide an apparatus for wireless communication. The apparatus generally includes a memory, and one or more processors coupled to the memory, the one or more processors and the memory being configured to determine one or more MCS parameters to be used for a communication link, select an MCS index corresponding to the or more MCS parameters, wherein a mapping of the MCS index to the one or more MCS parameters is dependent on a configuration of the communication link, generating control information comprising the MCS index, and transmit the control information to a UE.

Certain aspects provide an apparatus for wireless communication. The apparatus generally includes means for receiving control information indicating a MCS index corresponding to one or more MCS parameters to be used for a communication link, means for determining the one or more MCS parameters corresponding to the MCS index, wherein a mapping of the MCS index to the one or more MCS parameters is dependent on a configuration of the communication link, and means for communicating via the communication link in accordance with the one or more MCS parameters.

Certain aspects provide an apparatus for wireless communication. The apparatus generally includes means for determining one or more MCS parameters to be used for a communication link, means for selecting an MCS index corresponding to the or more MCS parameters, wherein a mapping of the MCS index to the one or more MCS parameters is dependent on a configuration of the communication link, means for generating control information comprising the MCS index, and transmitting the control information to a UE.

Certain aspects provide a computer-readable medium having instructions stored thereon to cause an apparatus to receive control information indicating a MCS index corresponding to one or more MCS parameters to be used for a communication link, determine the one or more MCS parameters corresponding to the MCS index, wherein a mapping of the MCS index to the one or more MCS parameters is dependent on a configuration of the communication link, and communicate via the communication link in accordance with the one or more MCS parameters.

Certain aspects provide a computer-readable medium having instructions stored thereon to cause an apparatus to determine one or more MCS parameters to be used for a communication link, select an MCS index corresponding to the or more MCS parameters, wherein a mapping of the MCS index to the one or more MCS parameters is dependent on a configuration of the communication link, generate control information comprising the MCS index, and transmitting the control information to a UE.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIGS. 4A and 4B illustrate various tables indicating the mapping of MCS indices to MCS parameters for respective communication link configurations, in accordance with certain aspects of the present disclosure.

FIGS. 5A and 5B illustrate tables for mapping of MCS indices to MCS parameters for different link configuration, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
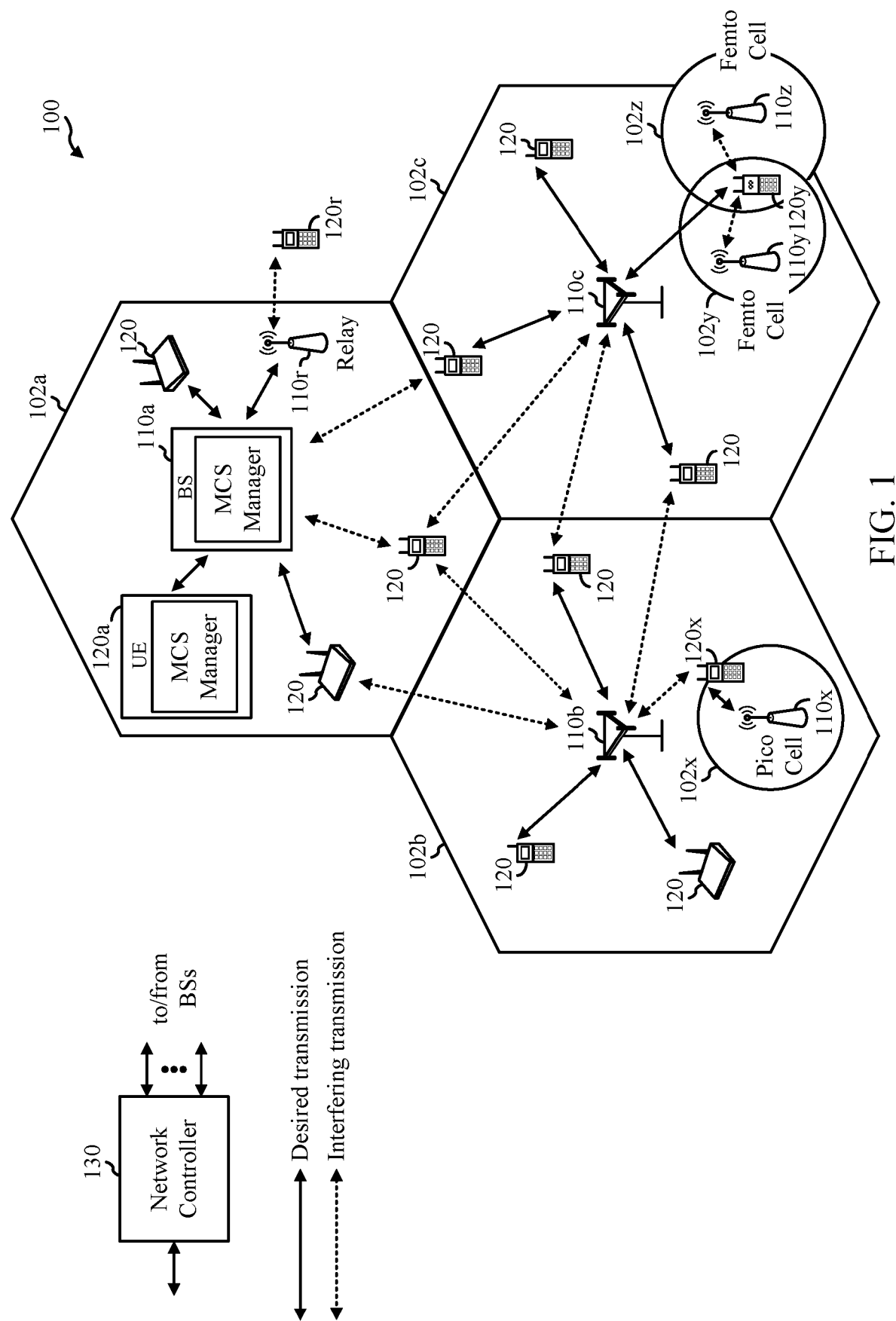
FIG. 1 is a block diagram conceptually illustrating an example telecommunications system, in accordance with certain aspects of the present disclosure.

Aspects of the present disclosure provide apparatus, methods, processing systems, and computer readable mediums for configuring a modulation and coding scheme (MCS) in a link configuration-specific manner, as described in more detail herein. For instance, an MCS index may refer to different MCS parameters to be used for a communication link depending on the configuration associated with the communication link. For example, a UE may interpret an MCS index from a BS differently to determine MCS parameters to be used for a communication link depending on a configuration (e.g., carrier frequency, numerology, waveform type) of the communication link. That is, the mapping of the MCS index to MCS parameters may be different depending on the link configuration. The different mappings of MCS indices may be indicated by separate tables for the different link configurations, or indicated by one or more baseline tables, as described in more detail herein. For instance, different tables for the link configurations may be derived from one or more baseline tables based on a predetermined rule specified in a standard. The implementation of the link configuration-specific MCS as described herein allows for the spectral efficiency of the communicating link to monotonically increase as values of the MCS indices increase.

The following description provides examples of traffic burst awareness in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the BSs 110 and UEs 120 may be configured for selecting a modulation and coding scheme (MCS) specific to a link configuration. As shown in FIG. 1, the BS 110a includes an MCS manager. The MCS manager may be configured to determine one or more MCS parameters to be used for a communication link, select an MCS index corresponding to the or more MCS parameters, a mapping of the MCS index to the one or more MCS parameters depending on a configuration of the communication link, generate control information comprising the MCS index, and transmit the control information to UE 120. In some examples, the mapping of the MCS index to the one or more MCS parameters may be indicated by different MCS tables depending on the configuration of the communication link. As shown in FIG. 1, the UE 120a includes an MCS manager. The MCS manager may be configured to receive control information indicating an MCS index corresponding to one or more MCS parameters to be used for a communication link, determine the one or more MCS parameters corresponding to the MCS index, a mapping of the MCS index to the one or more MCS parameters being dependent on a configuration of the communication link, and communicate via the communication link in accordance with the one or more MCS parameters.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Example Link Configuration Specific Modulation and Coding Scheme (MCS)

Third-generation partnership program (3GPP) may support new deployment scenarios and use cases for frequency spectrums above 52.6 GHz. In the new frequency spectrum involving higher carrier frequencies, several waveforms and methodologies may be considered for communication links. These may include implementing a scalable numerology, as well as flexible spectrum and bandwidth operations. For example, a target frequency range between 52.6 GHz and 114.25 GHz may enable several potential bands, carrier frequencies, and subcarrier spacing.

In some cases, the determination of modulation and coding scheme (MCS) parameters, such as modulation order and target code rate, may be oblivious to link configurations such as the orthogonal frequency-division multiplexing (OFDM) frame numerology (e.g., subcarrier spacing) and the component carrier frequency. With the implementation of the scalable link configurations, the communication link performance (e.g., spectral efficiency) may not monotonically improve with higher MCS indices as the carrier frequency is modified.

Certain aspects of the present disclosure are generally directed to a link configuration-specific MCS. For instance, an MCS index may be interpreted differently to determine MCS parameters to be used for a communication link depending on a configuration (e.g., carrier frequency, numerology, waveform type) of the communication link. That is, the mapping of the MCS index to MCS parameters may be different depending on the link configuration. The different mappings of MCS indices may be indicated by separate tables for the different link configurations, or indicated by one or more baseline tables. For instance, different tables for the link configurations may be derived from one or more baseline tables based on a predetermined rule specified in a standard. The implementation of the link configuration-specific MCS as described herein allows for the spectral efficiency of the communicating link to monotonically increase as values of the MCS indices increase.

Figure 2:
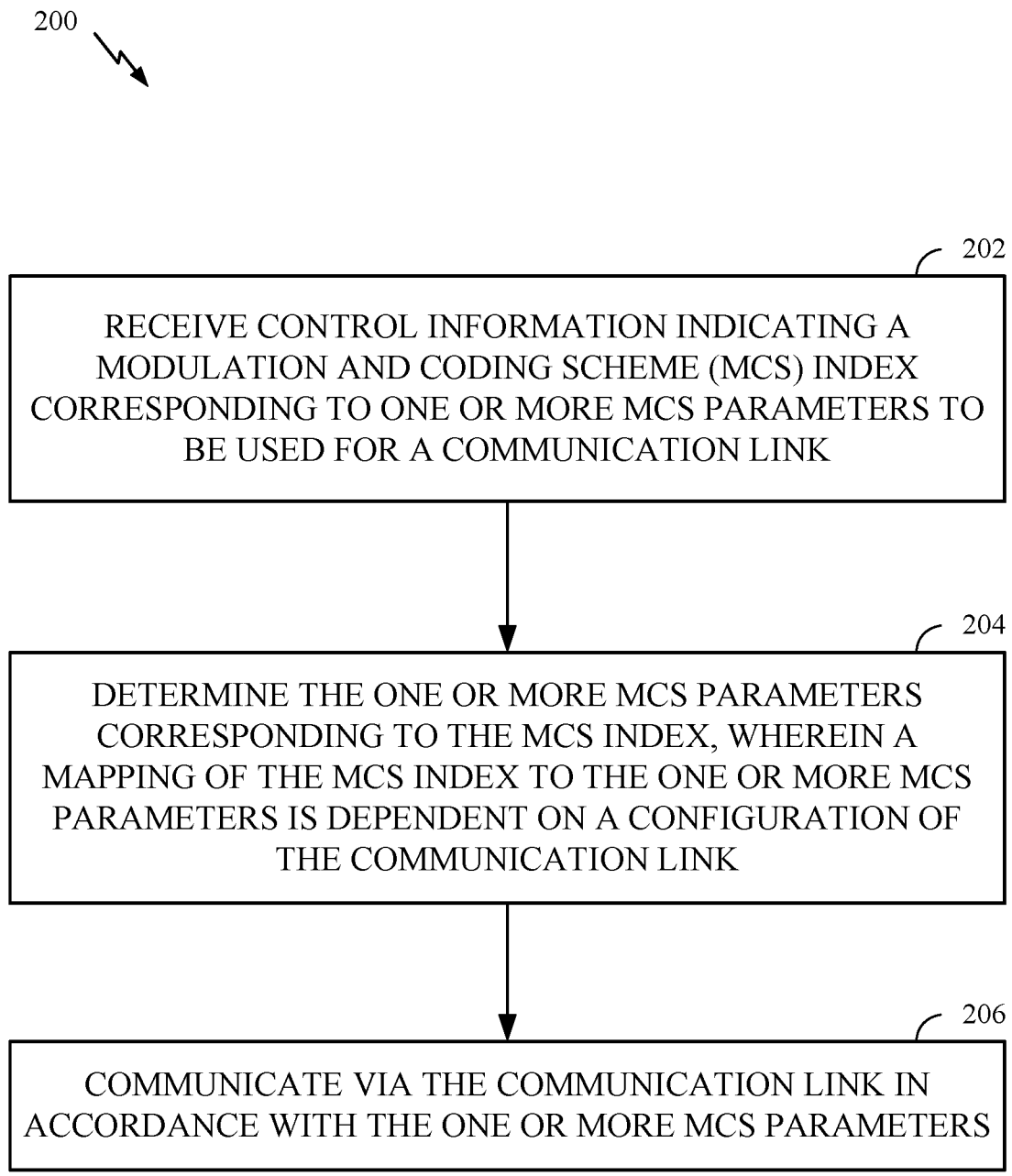
FIG. 2 is a flow diagram illustrating example operations for wireless communication by a user equipment (UE), in accordance with certain aspects of the present disclosure.

FIG. 2 is a flow diagram illustrating example operations 200 for wireless communication, in accordance with certain aspects of the present disclosure. The operations 200 may be performed, for example, by a user-equipment (UE) (e.g., such as a UE 120a in the wireless communication network 100).

Figure 8:
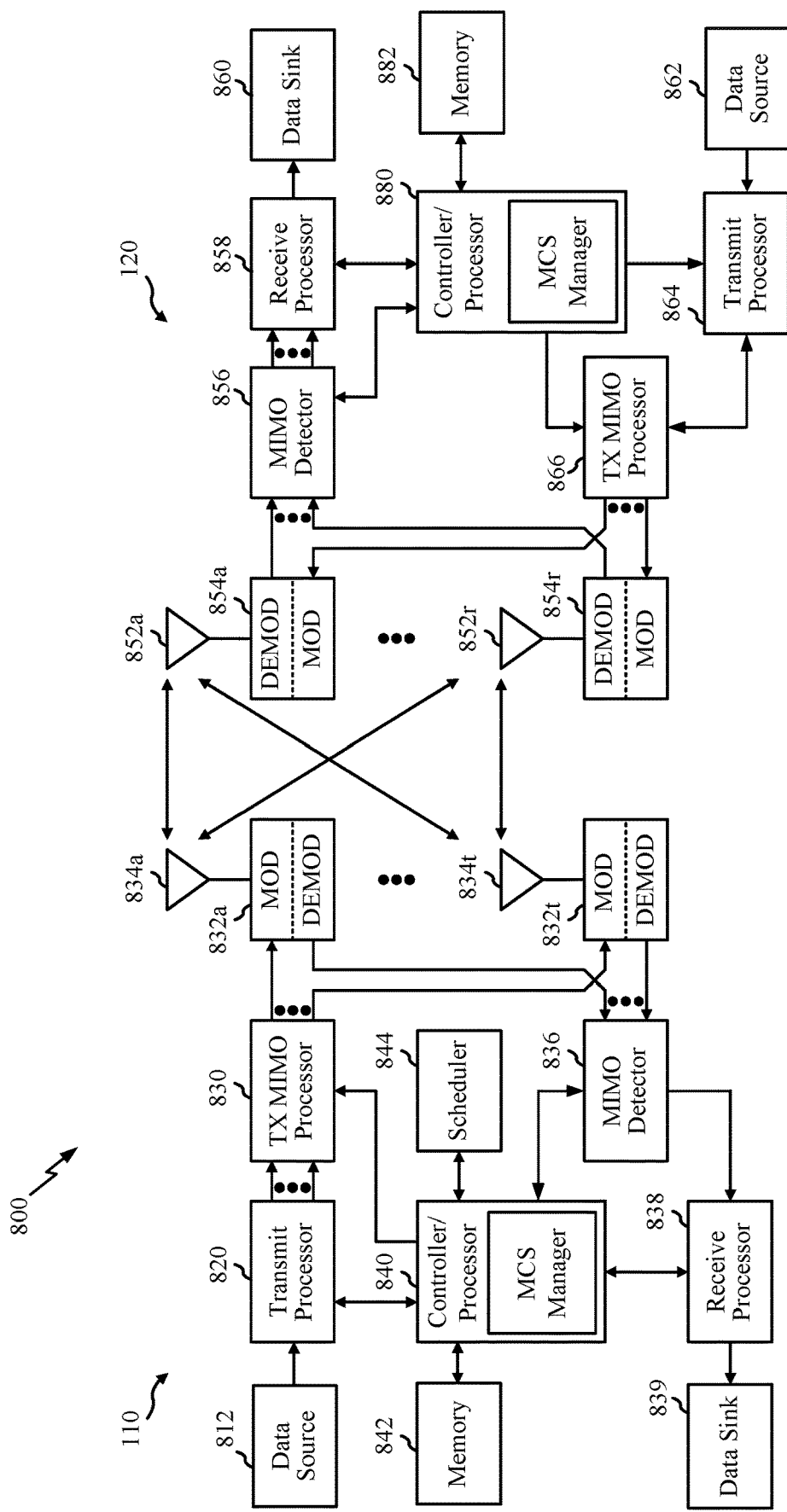
FIG. 8 is a block diagram conceptually illustrating a design of an example BS and UE, in accordance with certain aspects of the present disclosure.

Operations 200 may be implemented as software components that are executed and run on one or more processors (e.g., controller/processor 880 of FIG. 8). Further, the transmission and reception of signals by the UE in operations 200 may be enabled, for example, by one or more antennas (e.g., antennas 852 of FIG. 8). In certain aspects, the transmission and/or reception of signals by the UE may be implemented via a bus interface of one or more processors (e.g., controller/processor 880) obtaining and/or outputting signals.

The operations 200 may begin, at block 202, by the UE receiving control information (e.g., downlink control information (DCI)) indicating an MCS index corresponding to one or more MCS parameters to be used for a communication link, and at block 204, determining the one or more MCS parameters corresponding to the MCS index. In certain aspects, a mapping of the MCS index to the one or more MCS parameters may be dependent on a configuration of the communication link. The mapping may be dependent on a type of waveform associated with the communication link, a numerology associated with the communication link, and/or a carrier (e.g., specific frequency band) to be used for the communication. The numerology may correspond to at least one of a frame structure, duration, or subcarrier spacing associated with the communication link. Examples of types of waveforms may include OFDM, discrete Fourier transform (DFT)-spread-OFDM, or single-carrier (SC) waveforms, to name a few.

In one example, the mapping of the MCS index to the one or more MCS parameters may be indicated by different MCS tables depending on the configuration of the communication link. As another example, the mapping of the MCS index to the one or more MCS parameters is indicated by a table (e.g. baseline table). The table may indicate a different mapping of the MCS index to the one or more MCS parameters depending on the configuration of the communication link. For example, different rows of the table may correspond to different MCS indices depending of the configuration of the communication link. As another example, certain MCS indices (e.g., rows) of a baseline table may be deemed disabled (e.g., inapplicable) depending on the link configuration, as described in more detail herein. At block 206, the UE may communicate via the communication link in accordance with the one or more MCS parameters.

Figure 3:
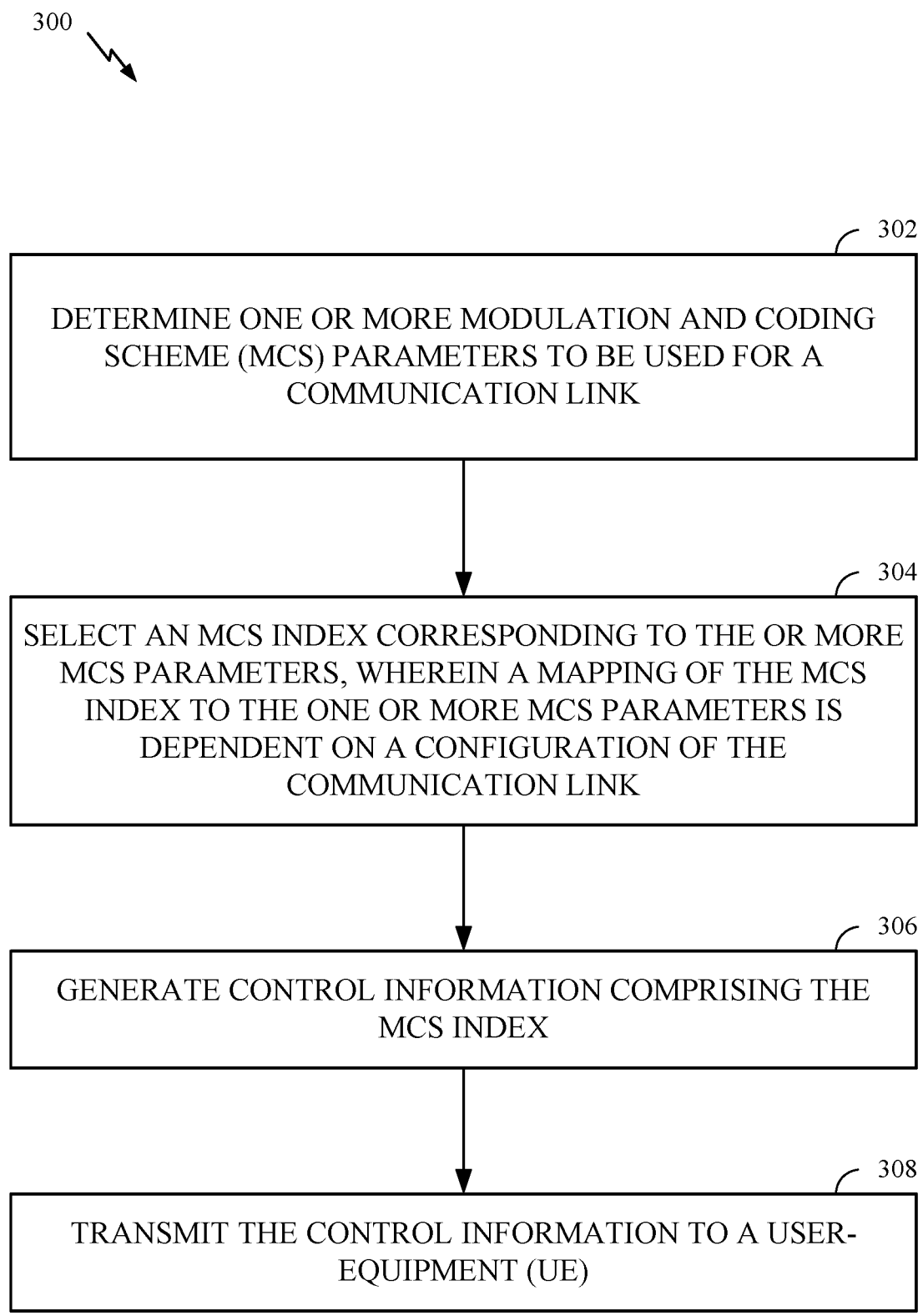
FIG. 3 is a flow diagram illustrating example operations for wireless communication by a base station (BS), in accordance with certain aspects of the present disclosure.

FIG. 3 is a flow diagram illustrating example operations 300 for wireless communication, in accordance with certain aspects of the present disclosure. The operations 300 may be performed, for example, by a network entity such as a BS (e.g., the BS 110a in the wireless communication network 100). The operations 300 may be complimentary operations by the BS to the operations 200 performed by the UE.

Operations 300 may be implemented as software components that are executed and run on one or more processors (e.g., controller/processor 840 of FIG. 8). Further, the transmission and reception of signals by the BS in operations 300 may be enabled, for example, by one or more antennas (e.g., antennas 834 of FIG. 8). In certain aspects, the transmission and/or reception of signals by the BS may be implemented via a bus interface of one or more processors (e.g., controller/processor 840) obtaining and/or outputting signals.

The operations 300 may begin, at block 302, by the network entity determining one or more MCS parameters to be used for a communication link, and at block 304, selecting an MCS index corresponding to the or more MCS parameters. In certain aspects, a mapping of the MCS index to the one or more MCS parameters may be dependent on a configuration of the communication link. At block 306, the network entity may generate control information (e.g., DCI) including the MCS index, and at block 308, transmit the control information to a UE.

As described herein, the mapping of the MCS index to the one or more MCS parameters may be indicated by different MCS tables depending on the configuration of the communication link. In other words, multiple MCS tables may be provided in a specification that is carrier, SCS, and/or waveform-specific, as described in more detail with respect to FIGS. 4A and 4B.

FIGS. 4A and 4B illustrate various tables 402, 404 indicating the mapping of MCS indices to MCS parameters for respective communication link configurations, in accordance with certain aspects of the present disclosure. For example, table 402 indicates mapping of MCS indices ($I_{MCS}$) (e.g., $I_{MCS}$ 0-9) to MCS parameters such as a modulation order $Q_m$ (e.g., $MO_0$-$MO_9$), target code rate ($TCR_0$-$TCR_9$), and spectral efficiency ($SE_0$-$SE_9$), specific to a first link configuration, and table 404 indicates mapping of $I_{MCS}$ (e.g., $I_{MCS}$ 0-7) to MCS parameters such as a modulation order $Q_m$ (e.g., $MO'_0$-$MO'_7$), a target code rate ($TCR'_0$-$TCR'_7$), and spectral efficiency ($SE'_0$-$SE'_7$), specific to a second link configuration. In some cases, one or more of the MCS parameters (e.g., $MO_0$-$MO_9$, $TCR_0$-$TCR_9$, $MO'_0$-$MO'_7$, or $TCR'_0$-$TCR'_7$) in each of the modulation order or target code rate columns of the tables 402, 404 may indicate the same value. For instance, $MO_0$-$MO_5$ may all indicate a modulation order of 2. Each of the link configurations may correspond to link parameters such as a specific frequency band associated with the communication link, a numerology of the communication link (e.g., frame format, duration, or subcarrier spacing (SCS)), or a type of waveform, or any combination thereof.

In certain aspects, the mapping of the MCS index to the one or more MCS parameters may be indicated by a baseline table. For instance, the baseline table may be interpreted differently depending on the link configuration. That is, the table may indicate a different mapping of the MCS index to the one or more MCS parameters depending on the link configuration. As one example, different rows of the table may correspond to different MCS indices depending of the configuration of the communication link.

FIGS. 5A and 5B illustrate tables 502, 504 for mapping of MCS indices to MCS parameters for different link configuration, in accordance with certain aspects of the present disclosure. As illustrated, MCS parameters may correspond to different MCS indices depending on the link configuration. For instance, as illustrated in FIG. 5A, the MCS parameters $MO_3$, $TCR_3$, and $SE_3$ map to the MCS index 1 for the first link configuration (configuration #1) and map to MCS index 2 for the second link configuration (configuration #2). In other words, certain rows of the table 502 are deactivated (e.g., inapplicable) depending on the link configuration (e.g., carrier frequency, SCS, and/or waveform). As another example, the mapping of MCS parameters to MCS indices may be swapped for different configurations. For instance, as illustrated in FIG. 5B, the mapping for MCS index 2 and MCS index 4 may be swapped for the first and second configurations in an attempt to implement a monotonically increasing spectral efficiency with respect to the MCS indices.

In certain aspects, the UE may determine the configuration to be used for determining the MCS of a data channel based on a corresponding control channel of the data channel. In some aspects, the UE may determine the configuration to be used based on some rule at the UE. In some aspects, the UE may receive an indication, from the BS, of the configuration to be used. For example, the indication of the configuration may be received via control signaling, radio resource control (RRC) signaling, or medium access control (MAC)-control element (CE).

Figure 6:
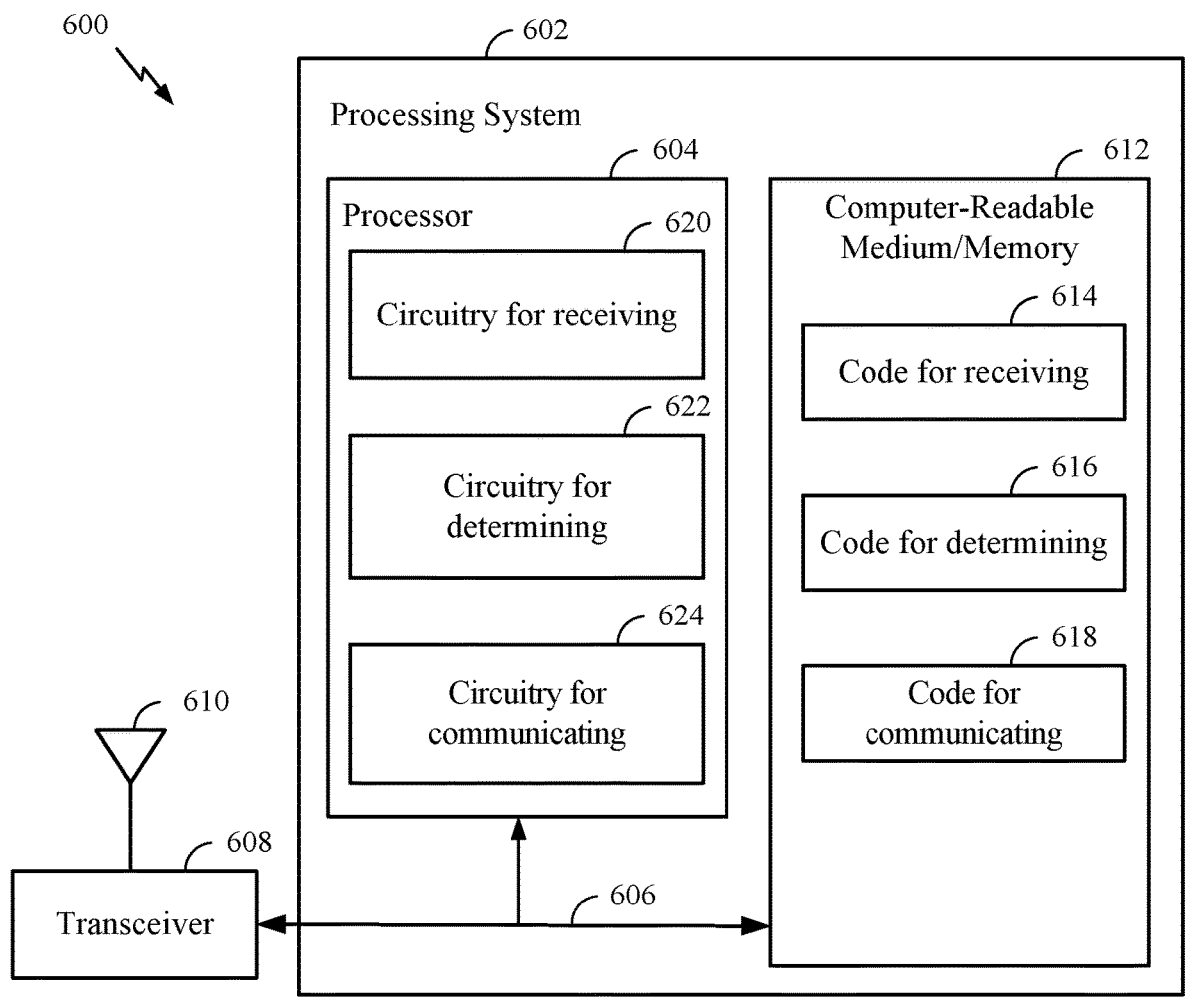
FIG. 6 illustrates a communications device that may include various components configured to perform operations for the techniques disclosed herein in accordance with aspects of the present disclosure.

FIG. 6 illustrates a communications device 600 that may include various components (e.g., corresponding to means-plus-function components) configured to perform operations for the techniques disclosed herein, such as the operations illustrated in FIG. 2. The communications device 600 includes a processing system 602 coupled to a transceiver 608. The transceiver 608 is configured to transmit and receive signals for the communications device 600 via an antenna 610, such as the various signals as described herein. The processing system 602 may be configured to perform processing functions for the communications device 600, including processing signals received and/or to be transmitted by the communications device 600.

The processing system 602 includes a processor 604 coupled to a computer-readable medium/memory 612 via a bus 606. In certain aspects, the computer-readable medium/memory 612 is configured to store instructions (e.g., computer-executable code) that when executed by the processor 604, cause the processor 604 to perform the operations illustrated in FIG. 2, or other operations for performing the various techniques discussed herein. In certain aspects, computer-readable medium/memory 612 stores code 614 for receiving control information indicating an MCS index corresponding to one or more MCS parameters to be used for a communication link; code 616 for determining the one or more MCS parameters corresponding to the MCS index; and code 618 for communicating via the communication link in accordance with the one or more MCS parameters. In certain aspects, the processor 604 has circuitry configured to implement the code stored in the computer-readable medium/memory 612. The processor 604 includes circuitry 620 for receiving control information indicating an MCS index corresponding to one or more MCS parameters to be used for a communication link; circuitry 622 for determining the one or more MCS parameters corresponding to the MCS index; and circuitry 624 for communicating via the communication link in accordance with the one or more MCS parameters.

Figure 7:
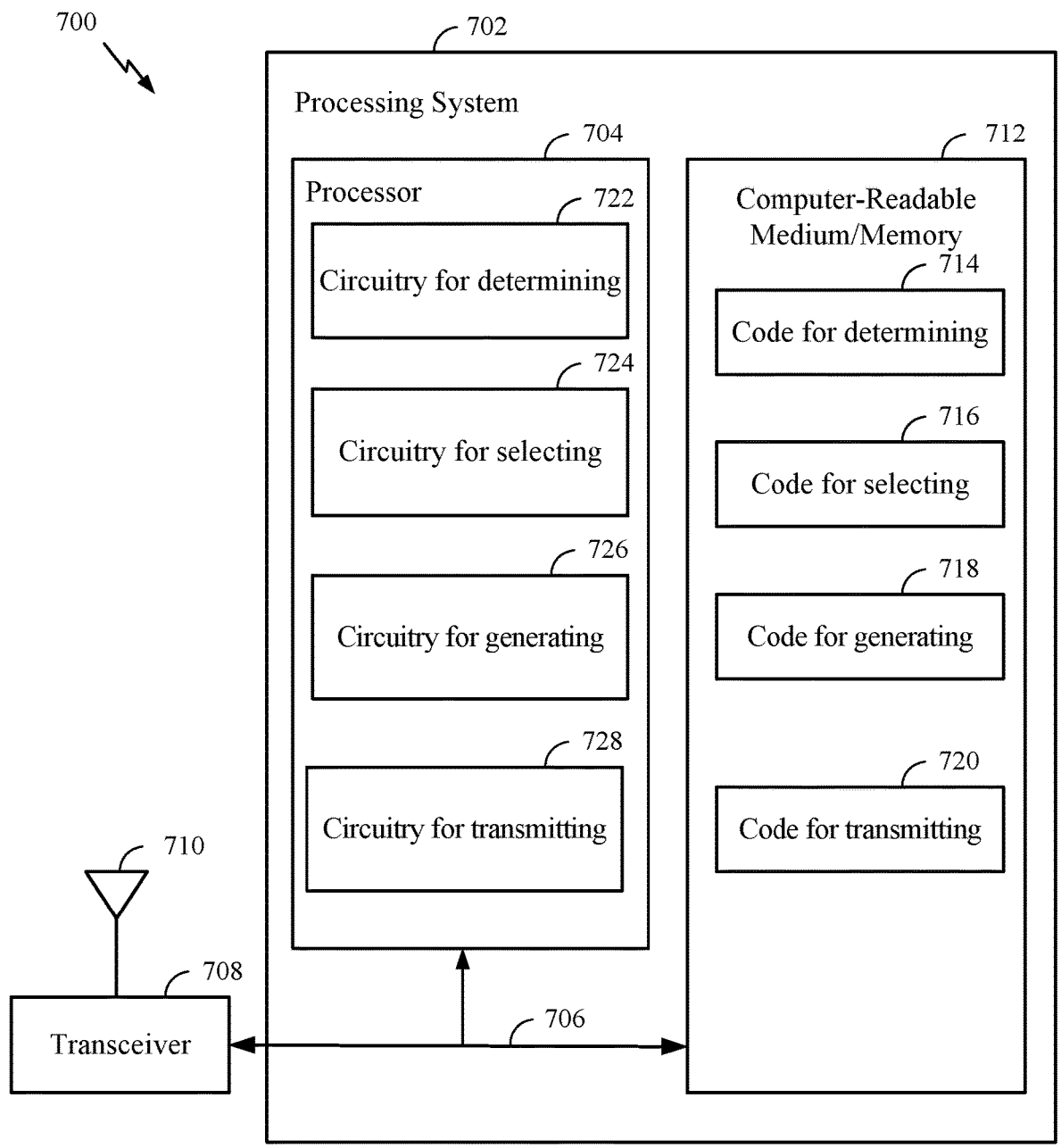
FIG. 7 illustrates a communications device that may include various components configured to perform operations for the techniques disclosed herein in accordance with aspects of the present disclosure.

FIG. 7 illustrates a communications device 700 that may include various components (e.g., corresponding to means-plus-function components) configured to perform operations for the techniques disclosed herein, such as the operations illustrated in FIG. 3. The communications device 700 includes a processing system 702 coupled to a transceiver 708. The transceiver 708 is configured to transmit and receive signals for the communications device 700 via an antenna 710, such as the various signals as described herein. The processing system 702 may be configured to perform processing functions for the communications device 700, including processing signals received and/or to be transmitted by the communications device 700.

The processing system 702 includes a processor 704 coupled to a computer-readable medium/memory 712 via a bus 706. In certain aspects, the computer-readable medium/memory 712 is configured to store instructions (e.g., computer-executable code) that when executed by the processor 704, cause the processor 704 to perform the operations illustrated in FIG. 3, or other operations for performing the various techniques discussed herein. In certain aspects, computer-readable medium/memory 712 stores code 714 for determining one or more MCS parameters to be used for a communication link; code 716 for selecting an MCS index corresponding to the or more MCS parameters; code 718 for generating control information comprising the MCS index, and code 720 for transmitting the control information to a UE. In certain aspects, the processor 704 has circuitry configured to implement the code stored in the computer-readable medium/memory 712. The processor 704 includes circuitry 722 for determining one or more MCS parameters to be used for a communication link; circuitry 724 for selecting an MCS index corresponding to the or more MCS parameters; code 726 for generating control information comprising the MCS index, and code 728 for transmitting the control information to a UE.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

FIG. 8 illustrates example components of BS 110a and UE 120a (e.g., in the wireless communication network 100 of FIG. 1), which may be used to implement aspects of the present disclosure.

At the BS 110a, a transmit processor 820 may receive data from a data source 812 and control information from a controller/processor 840. The control information may be for the physical broadcast channel (PBCH), physical control format indicator channel (PCFICH), physical hybrid ARQ indicator channel (PHICH), PDCCH, group common PDCCH (GC PDCCH), etc. The data may be for the PDSCH, etc. The processor 820 may process (e.g., encode and symbol map) the data and control information to obtain data symbols and control symbols, respectively. The transmit processor 820 may also generate reference symbols, such as for the primary synchronization signal (PSS), secondary synchronization signal (SSS), and cell-specific reference signal (CRS). A transmit (TX) multiple-input multiple-output (MIMO) processor 830 may perform spatial processing (e.g., precoding) on the data symbols, the control symbols, and/or the reference symbols, if applicable, and may provide output symbol streams to the modulators (MODs) 832a-832t. Each modulator 832 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 832a-832t may be transmitted via the antennas 834a-834t, respectively.

At the UE 120a, the antennas 852a-852r may receive the downlink signals from the BS 110a and may provide received signals to the demodulators (DEMODs) in transceivers 854a-854r, respectively. Each demodulator 854 may condition (e.g., filter, amplify, downconvert, and digitize) a respective received signal to obtain input samples. Each demodulator may further process the input samples (e.g., for OFDM, etc.) to obtain received symbols. A MIMO detector 856 may obtain received symbols from all the demodulators 854a-854r, perform MIMO detection on the received symbols if applicable, and provide detected symbols. A receive processor 858 may process (e.g., demodulate, deinterleave, and decode) the detected symbols, provide decoded data for the UE 120a to a data sink 860, and provide decoded control information to a controller/processor 880.

On the uplink, at UE 120a, a transmit processor 864 may receive and process data (e.g., for the physical uplink shared channel (PUSCH)) from a data source 862 and control information (e.g., for the physical uplink control channel (PUCCH) from the controller/processor 880. The transmit processor 864 may also generate reference symbols for a reference signal (e.g., for the sounding reference signal (SRS)). The symbols from the transmit processor 864 may be precoded by a TX MIMO processor 866 if applicable, further processed by the demodulators in transceivers 854a-854r (e.g., for SC-FDM, etc.), and transmitted to the BS 110a. At the BS 110a, the uplink signals from the UE 120a may be received by the antennas 834, processed by the modulators 832, detected by a MIMO detector 836 if applicable, and further processed by a receive processor 838 to obtain decoded data and control information sent by the UE 120a. The receive processor 838 may provide the decoded data to a data sink 839 and the decoded control information to the controller/processor 840.

The memories 842 and 882 may store data and program codes for BS 110a and UE 120a, respectively. A scheduler 844 may schedule UEs for data transmission on the downlink and/or uplink.

The controller/processor 880 and/or other processors and modules at the UE 120a may perform or direct the execution of processes for the techniques described herein. For example, as shown in FIG. 8, the controller/processor 840 of the BS 110a has an MCS manager that may be configured for configuring an MCS in a link configuration-specific manner, according to aspects described herein. As shown in FIG. 8, the controller/processor 880 of the UE 120a has an MCS manager that may be configured for configuring an MCS in a link configuration-specific manner, according to aspects described herein. Although shown at the Controller/Processor, other components of the UE 120a and BS 110a may be used performing the operations described herein.

Example Aspects

In a first aspect, a method for wireless communication by a user-equipment (UE), comprises receiving control information indicating a modulation and coding scheme (MCS) index corresponding to one or more MCS parameters to be used for a communication link; determining the one or more MCS parameters corresponding to the MCS index, wherein a mapping of the MCS index to the one or more MCS parameters is dependent on a configuration of the communication link; and communicating via the communication link in accordance with the one or more MCS parameters.

In a second aspect, in combination with the first aspect, the mapping of the MCS index to the one or more MCS parameters is indicated by different MCS tables depending on the configuration of the communication link.

In a third aspect, in combination with the second aspect, each of the MCS tables include a plurality of MCS indices, wherein a spectral efficiency of the communicating link monotonically increases as values of the plurality of MCS indices increase.

In a fourth aspect, in combination with one or more of the first aspect to the third aspect, the mapping of the MCS index to the one or more MCS parameters is indicated by a table, and different rows of the table correspond to different MCS indices depending on the configuration of the communication link.

In a fifth aspect, in combination with one or more of the first aspect to the fourth aspect, the mapping of the MCS index to the one or more MCS parameters is indicated by a table, the table indicating a different mapping of the MCS index to the one or more MCS parameters depending on the configuration of the communication link.

In sixth aspect, in combination with one or more of the first aspect to the fifth aspect, the configuration of the communication link comprises at least one of a type of waveform associated with the communication link, a numerology associated with the communication link, or a carrier frequency to be used for the communication.

In a seventh aspect, in combination with the sixth aspect, the numerology associated with the communication link corresponds to at least one of a frame structure, duration, or subcarrier spacing associated with the communication link.

In an eighth aspect, in combination with one or more of the first aspect to the seventh aspect, the one or more MCS parameters comprise at least one of a modulation order, target code rate, or spectral efficiency.

In a ninth aspect, a method for wireless communication by a network entity, comprises determining one or more modulation and coding scheme (MCS) parameters to be used for a communication link; selecting an MCS index corresponding to the or more MCS parameters, wherein a mapping of the MCS index to the one or more MCS parameters is dependent on a configuration of the communication link; generating control information comprising the MCS index; and transmitting the control information to a user-equipment (UE).

In a tenth aspect, in combination with the ninth aspect, the mapping of the MCS index to the one or more MCS parameters is indicated by different MCS tables depending on the configuration of the communication link.

In an eleventh aspect, in combination with the tenth aspect, each of the MCS tables include a plurality of MCS indices, wherein a spectral efficiency of the communicating link monotonically increases as values of the plurality of MCS indices increase.

In a twelfth aspect, in combination with one or more of the ninth aspect to the eleventh aspect, the mapping of the MCS index to the one or more MCS parameters is indicated by a table, and wherein different rows of the table correspond to different MCS indices depending of the configuration of the communication link.

In a thirteenth aspect, in combination with one or more of the ninth aspect to the twelfth aspect, the mapping of the MCS index to the one or more MCS parameters is indicated by a table, the table indicating a different mapping of the MCS index to the one or more MCS parameters depending on the configuration of the communication link.

In a fourteenth aspect, in combination with one or more of the ninth aspect to the thirteenth aspect, the configuration of the communication link comprises at least one of a type of waveform associated with the communication link, a numerology associated with the communication link, or a carrier frequency to be used for the communication.

In a fifteenth aspect, in combination with the fourteenth aspect, the numerology associated with the communication link corresponds to at least one of a frame structure, duration, or subcarrier spacing associated with the communication link.

In a sixteenth aspect, in combination with one or more of the ninth aspect to the fifteenth aspect, the one or more MCS parameters comprise at least one of a modulation order, target code rate, or spectral efficiency.

In a seventeenth aspect, an apparatus for wireless communication by a user-equipment (UE), comprises a memory; and one or more processor coupled to the memory, the one or more processors and the memory being configured to: receive control information indicating a modulation and coding scheme (MCS) index corresponding to one or more MCS parameters to be used for a communication link; determine the one or more MCS parameters corresponding to the MCS index, wherein a mapping of the MCS index to the one or more MCS parameters is dependent on a configuration of the communication link; and communicate via the communication link in accordance with the one or more MCS parameters.

In an eighteenth aspect, in combination with the seventeenth aspect, the mapping of the MCS index to the one or more MCS parameters is indicated by different MCS tables depending on the configuration of the communication link.

In a nineteenth aspect, in combination with the eighteenth aspect, each of the MCS tables include a plurality of MCS indices, wherein a spectral efficiency of the communicating link monotonically increases as values of the plurality of MCS indices increase.

In a twentieth aspect, in combination with one or more of the seventeenth aspect to the nineteenth aspect, the mapping of the MCS index to the one or more MCS parameters is indicated by a table, and wherein different rows of the table correspond to different MCS indices depending on the configuration of the communication link.

In a twenty-first aspect, in combination with one or more of the seventeenth aspect to the twentieth aspect, the mapping of the MCS index to the one or more MCS parameters is indicated by a table, the table indicating a different mapping of the MCS index to the one or more MCS parameters depending on the configuration of the communication link.

In a twenty-second aspect, in combination with one or more of the seventeenth aspect to the twenty-first aspect, the configuration of the communication link comprises at least one of a type of waveform associated with the communication link, a numerology associated with the communication link, or a carrier frequency to be used for the communication.

In a twenty-third aspect, in combination with the twenty-second aspect, the numerology associated with the communication link corresponds to at least one of a frame structure, duration, or subcarrier spacing associated with the communication link.

In a twenty-fourth aspect, an apparatus for wireless communication by a network entity, comprises a memory; and one or more processor coupled to the memory, the one or more processors and the memory being configured to: determine one or more modulation and coding scheme (MCS) parameters to be used for a communication link; select an MCS index corresponding to the or more MCS parameters, wherein a mapping of the MCS index to the one or more MCS parameters is dependent on a configuration of the communication link; generate control information comprising the MCS index; and transmit the control information to a user-equipment (UE).

In a twenty-fifth aspect, in combination with the twenty-fourth aspect, the mapping of the MCS index to the one or more MCS parameters is indicated by different MCS tables depending on the configuration of the communication link.

In a twenty-sixth aspect, in combination with one or more of the twenty-fourth aspect to the twenty-fifth aspect, each of the MCS tables include a plurality of MCS indices, wherein a spectral efficiency of the communicating link monotonically increases as values of the plurality of MCS indices increase.

In a twenty-seventh aspect, in combination with one or more of the twenty-fourth aspect to the twenty-sixth aspect, the mapping of the MCS index to the one or more MCS parameters is indicated by a table, and wherein different rows of the table correspond to different MCS indices depending of the configuration of the communication link.

In a twenty-eighth aspect, in combination with one or more of the twenty-fourth aspect to the twenty-seventh aspect, the mapping of the MCS index to the one or more MCS parameters is indicated by a table, the table indicating a different mapping of the MCS index to the one or more MCS parameters depending on the configuration of the communication link.

In a twenty-ninth aspect, in combination with one or more of the twenty-fourth aspect to the twenty-eighth aspect, the configuration of the communication link comprises at least one of a type of waveform associated with the communication link, a numerology associated with the communication link, or a carrier frequency to be used for the communication.

In a thirtieth aspect, in combination with the twenty-ninth aspect, the numerology associated with the communication link corresponds to at least one of a frame structure, duration, or subcarrier spacing associated with the communication link.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/ or encoded) thereon, the instructions being executable by one or more processors to perform the operations described herein, for example, instructions for performing the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user-equipment (UE), comprising:
receiving control information indicating a modulation and coding scheme (MCS) index corresponding to one or more MCS parameters to be used for a communication link;
determining the one or more MCS parameters corresponding to the MCS index in one of different MCS tables defined for different configurations of the communication link, wherein the different configurations of the communication link comprise different types of waveforms associated with the communication link, wherein a mapping of the MCS index to the one or more MCS parameters is indicated by the different MCS tables depending on the different configurations of the communication link; and
communicating via the communication link in accordance with the one or more MCS parameters.

2. The method of claim 1, further comprising receiving an indication of a configuration of the different configurations via control signaling, radio resource control (RRC) signaling, or medium access control (MAC)-control element (CE).

3. The method of claim 2, wherein each of the different MCS tables includes a plurality of MCS indices, wherein a spectral efficiency of the communication link monotonically increases as values of the plurality of MCS indices increase.

4. The method of claim 1, wherein the mapping of the MCS index to the one or more MCS parameters is further indicated by a first MCS table of the different MCS tables, and wherein different rows of the first MCS table correspond to different MCS indices depending on a first configuration of the different configurations of the communication link.

5. The method of claim 1, wherein the mapping of the MCS index to the one or more MCS parameters is further indicated by a first MCS table of the different MCS tables, the first MCS table indicating a different mapping of the MCS index to the one or more MCS parameters depending on a first configuration of the different configurations of the communication link.

6. The method of claim 1, wherein the different configurations of the communication link further comprise at least one of a numerology associated with the communication link or a carrier frequency to be used for communication on the communication link, and wherein the numerology associated with the communication link corresponds to at least one of a frame structure, packet duration, or subcarrier spacing associated with the communication link.

7. The method of claim 1, wherein the one or more MCS parameters comprise at least one of a modulation order, target code rate, or spectral efficiency.

8. A method for wireless communication by a network entity, comprising:
determining one or more modulation and coding scheme (MCS) parameters to be used for a communication link;
selecting an MCS index corresponding to the one or more MCS parameters in one of different MCS tables defined for different configurations of the communication link, wherein the different configurations of the communication link comprise different types of waveform associated with the communication link, wherein a mapping of the MCS index to the one or more MCS parameters is indicated by the different MCS tables depending on the different configurations of the communication link;
generating control information comprising the MCS index; and
transmitting the control information to a user-equipment (UE).

9. The method of claim 8, further comprising transmitting an indication of a configuration of the different configurations via control signaling, radio resource control (RRC) signaling, or medium access control (MAC)-control element (CE).

10. The method of claim 9, wherein each of the different MCS tables includes a plurality of MCS indices, wherein a spectral efficiency of the communication link monotonically increases as values of the plurality of MCS indices increase.

11. The method of claim 8, wherein the mapping of the MCS index to the one or more MCS parameters is further indicated by a first MCS table of the different MCS tables, and wherein different rows of the first MCS table correspond to different MCS indices depending on a first configuration of the different configurations of the communication link.

12. The method of claim 8, wherein the mapping of the MCS index to the one or more MCS parameters is further indicated by a first MCS table of the different MCS tables, the first MCS table indicating a different mapping of the MCS index to the one or more MCS parameters depending on a first configuration of the different configurations of the communication link.

13. The method of claim 8, wherein the different configurations of the communication link further comprise at least one of a numerology associated with the communication link or a carrier frequency to be used for communication on the communication link, and wherein the numerology associated with the communication link corresponds to at least one of a frame structure, packet duration, or subcarrier spacing associated with the communication link.

14. The method of claim 8, wherein the one or more MCS parameters comprise at least one of a modulation order, target code rate, or spectral efficiency.

15. An apparatus for wireless communication by a user-equipment (UE), comprising:
a memory; and
one or more processors coupled to the memory, the one or more processors and the memory being configured to:

receive control information indicating a modulation and coding scheme (MCS) index corresponding to one or more MCS parameters to be used for a communication link;

determine the one or more MCS parameters corresponding to the MCS index in one of different MCS tables defined for different configurations of the communication link, wherein the different configurations of the communication link comprise different types of waveform associated with the communication link, wherein a mapping of the MCS index to the one or more MCS parameters is indicated by the different MCS tables depending on the different configurations of the communication link; and communicate via the communication link in accordance with the one or more MCS parameters.

16. The apparatus of claim 15, wherein the one or more processors are further configured to: receive an indication of a configuration of the different configurations via control signaling, radio resource control (RRC) signaling, or medium access control (MAC)-control element (CE).

17. The apparatus of claim 16, wherein each of the different MCS tables includes a plurality of MCS indices, wherein a spectral efficiency of the communication link monotonically increases as values of the plurality of MCS indices increase.

18. The apparatus of claim 15, wherein the mapping of the MCS index to the one or more MCS parameters is further indicated by a first MCS table of the different MCS tables, and wherein different rows of the first MCS table correspond to different MCS indices depending on a first configuration of the different configurations of the communication link.

19. The apparatus of claim 15, wherein the mapping of the MCS index to the one or more MCS parameters is further indicated by a first MCS table of the different MCS tables, the first MCS table indicating a different mapping of the MCS index to the one or more MCS parameters depending on a first configuration of the different configurations of the communication link.

20. The apparatus of claim 15, wherein the different configurations of the communication link further comprise at least one of a numerology associated with the communication link or a carrier frequency to be used for communication on the communication link, and wherein the numerology associated with the communication link corresponds to at least one of a frame structure, packet duration, or subcarrier spacing associated with the communication link.

21. An apparatus for wireless communication by a network entity, comprising:
a memory; and
one or more processors coupled to the memory, the one or more processors and the memory being configured to:
determine one or more modulation and coding scheme (MCS) parameters to be used for a communication link;
select an MCS index corresponding to the one or more MCS parameters in one of different MCS tables defined for different configurations of the communication link, wherein the different configurations of the communication link comprise different types of waveform associated with the communication link, wherein a mapping of the MCS index to the one or more MCS parameters is indicated by the different MCS tables depending on the different configurations of the communication link;
generate control information comprising the MCS index; and
transmit the control information to a user-equipment (UE).

22. The apparatus of claim 21, wherein the one or more processors are further configured to: transmit an indication of a configuration of the different configurations via control signaling, radio resource control (RRC) signaling, or medium access control (MAC)-control element (CE).

23. The apparatus of claim 22, wherein each of the different MCS tables includes a plurality of MCS indices, wherein a spectral efficiency of the communication link monotonically increases as values of the plurality of MCS indices increase.

24. The apparatus of claim 21, wherein the mapping of the MCS index to the one or more MCS parameters is further indicated by a first MCS table of the different MCS tables, and wherein different rows of the first MCS table correspond to different MCS indices depending on a first configuration of the different configurations of the communication link.

25. The apparatus of claim 21, wherein the mapping of the MCS index to the one or more MCS parameters is further indicated by a first MCS table of the different MCS tables, the first MCS table indicating a different mapping of the MCS index to the one or more MCS parameters depending on a first configuration of the different configurations of the communication link.

26. The apparatus of claim 21, wherein the different configurations of the communication link further comprise at least one of a numerology associated with the communication link or a carrier frequency to be used for communication on the communication link, and wherein the numerology associated with the communication link corresponds to at least one of a frame structure, packet duration, or subcarrier spacing associated with the communication link.

* * * * *